US012590574B2

(12) United States Patent
Faccio et al.

(10) Patent No.: US 12,590,574 B2
(45) Date of Patent: Mar. 31, 2026

(54) POWDER SUPPLY PUMP

(71) Applicants: Irene Faccio, Dueville (IT); Penelope Faccio, Colceresa (IT)

(72) Inventors: Irene Faccio, Dueville (IT); Penelope Faccio, Colceresa (IT)

( * ) Notice: Subject to any disclaimer, the term of this patent is extended or adjusted under 35 U.S.C. 154(b) by 0 days.

(21) Appl. No.: 18/858,048

(22) PCT Filed: Oct. 18, 2022

(86) PCT No.: PCT/EP2022/078972
§ 371 (c)(1),
(2) Date: Oct. 18, 2024

(87) PCT Pub. No.: WO2023/208398
PCT Pub. Date: Nov. 2, 2023

(65) Prior Publication Data

US 2025/0109741 A1 Apr. 3, 2025

(30) Foreign Application Priority Data

Apr. 27, 2022 (IT) ........................ 102022000008237

(51) Int. Cl.
*F04B 15/00* (2006.01)
*B05B 7/14* (2006.01)
*F04B 13/00* (2006.01)
*F04B 53/10* (2006.01)

(52) U.S. Cl.
CPC .............. *F04B 15/00* (2013.01); *F04B 13/00* (2013.01); *F04B 53/1072* (2013.01); *B05B 7/1472* (2013.01)

(58) Field of Classification Search
CPC ...... F04B 15/00; F04B 13/00; F04B 53/1072; B05B 7/1472; B05B 7/144; G01F 11/022; G01F 11/24; G01F 15/005; G01F 11/18; G01F 11/003
See application file for complete search history.

(56) References Cited

U.S. PATENT DOCUMENTS 4,747,731 A * 5/1988 Nagasaka ............ G05D 11/006 406/14
5,454,271 A * 10/1995 Yamamoto .............. B05B 12/08 73/32 R
5,487,624 A * 1/1996 Toyota .................. B05B 12/085 406/14

(Continued)

FOREIGN PATENT DOCUMENTS

DE 10353968 7/2005

*Primary Examiner* — Matthew T Largi
(74) *Attorney, Agent, or Firm* — DUANE MORRIS LLP; Gregory M. Lefkowitz; Daniel J. Tarr

(57) ABSTRACT

A pump, supplying powder for a variety of uses, has an outer body with an internal cavity; a compartment in the body has a volume which is variable on command by means of a motor drive, from a first condition, in which it fills with powder through openings that are in communication with a container that contains the powder to be dispensed, to a second condition, in which it is in contact with the initial part of a dispensing duct; a valve intercepts the duct and a first connector supplies compressed air to the compartment; a second connector controls the valve, and a third connector supplies air for the conveyance of the powder.

15 Claims, 5 Drawing Sheets

(56) References Cited

U.S. PATENT DOCUMENTS

| | | | | | |
|---|---|---|---|---|---|
| 5,928,423 | A * | 7/1999 | Toyota | B05B 7/1404 239/311 |
| 6,176,647 | B1 * | 1/2001 | Itoh | B05B 7/144 406/176 |
| 9,834,391 | B2 | 12/2017 | Mauchle | |
| 2022/0016653 | A1 * | 1/2022 | Tobler | B05B 7/1472 |

* cited by examiner

POWDER SUPPLY PUMP

CROSS-REFERENCE TO RELATED APPLICATIONS

This application is a § 371 national stage entry of International Application No. PCT/EP2022/078972, filed Oct. 18, 2022, which claims priority to Italian Application No. 102022000008237, filed Apr. 27, 2022, the entire contents of which are incorporated herein by reference.

The present invention relates to a pump for supplying powder for a variety of uses.

The pump according to the invention is adapted to feed a device that applies powder coating material which is dispensed, for example, by a spray gun.

There are various types of dispensers that basically differ in the ratio between the volume of conveyance air and the amount of powder conveyed.

The problems of the conventional devices are many and are mainly related to the characteristics of the powders being moved.

The powder is electrostatically deposited on the objects to be coated and then the object is placed in an oven where, due to the temperature, the powder melts, coats the object, and is stably fixed to the object.

Therefore, a most influential parameter is the temperature of the powder, which must be controlled and kept low enough before the object is placed in the oven.

While moving from a storage container to a dispenser, the powder flows with friction inside the components of the pump, causing local temperature rises with the possibility of melting and forming of agglomerates.

In such instance, cleaning interventions must be made, shutting down the system in which the pump is mounted; if necessary, the pump must be disassembled.

For a good operation of the dispenser system, it would be convenient to have a large quantity, in percentage, of powder in the air stream that conveys the powder, but this increases the possibility of local friction of the powder and jamming of the pump.

The aim of the present invention is to provide a pump that reduces the problems found in conventional pumps.

Within the scope of this aim, a particular object of the invention is to provide a pump that has non-critical operation.

A further object of the invention is to provide a pump made of a small number of components, so as to reduce powder friction and limit maintenance.

A further object of the invention is to provide a pump that can be easily disassembled and cleaned in a short time.

This aim and these objects, as well as others which will become better apparent hereinafter, are achieved by a powder supply pump, as claimed in the appended claims.

Further characteristics and advantages will become better apparent from the description of preferred, but not exclusive, embodiments of a pump according to the invention, illustrated by way of non-limiting example in the accompanying drawings, wherein.

Figure 1:
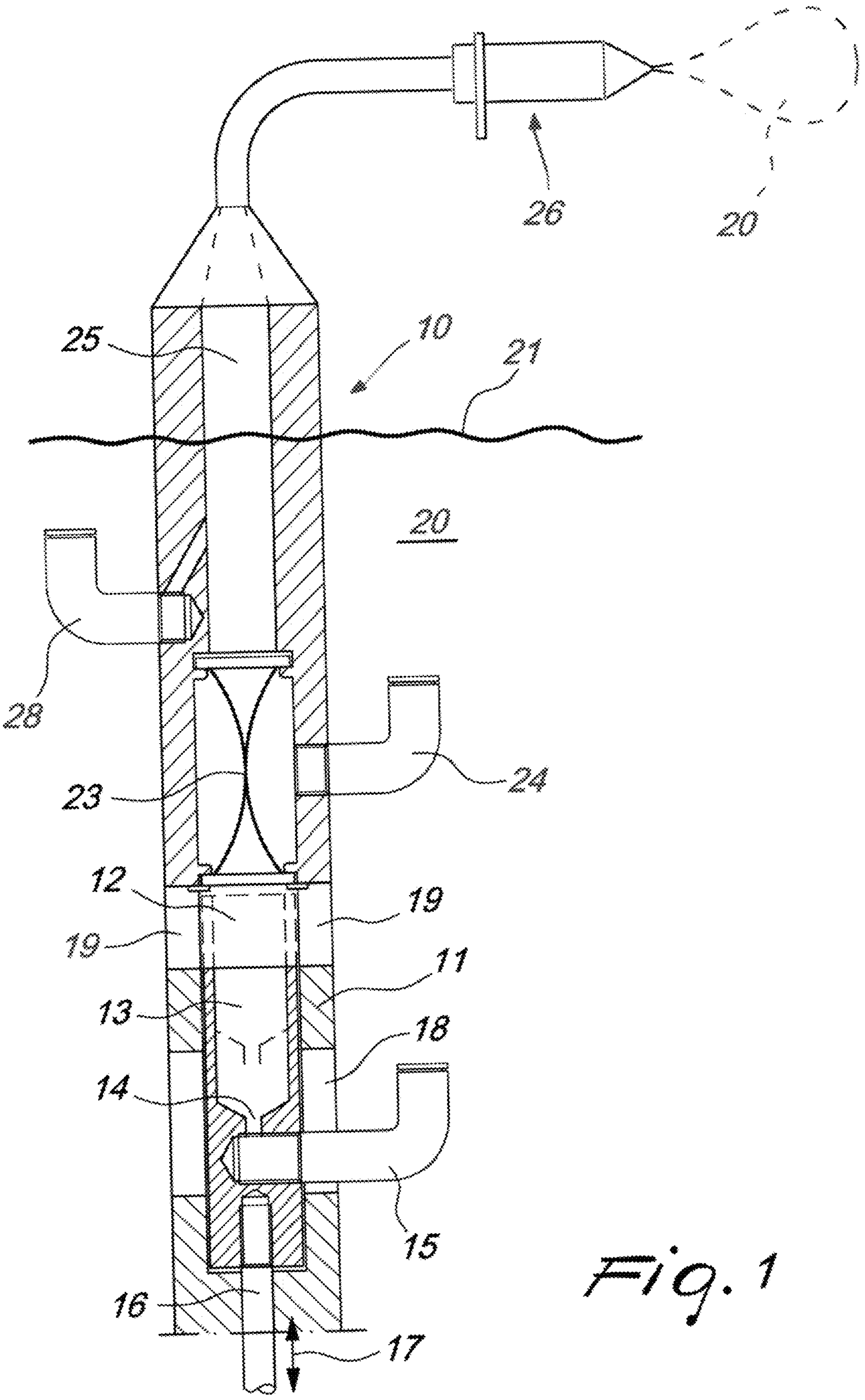
FIG. 1 is a partially sectional view of a pump according to the invention, shown in the step of filling the compartment with powder.
Figure 2:
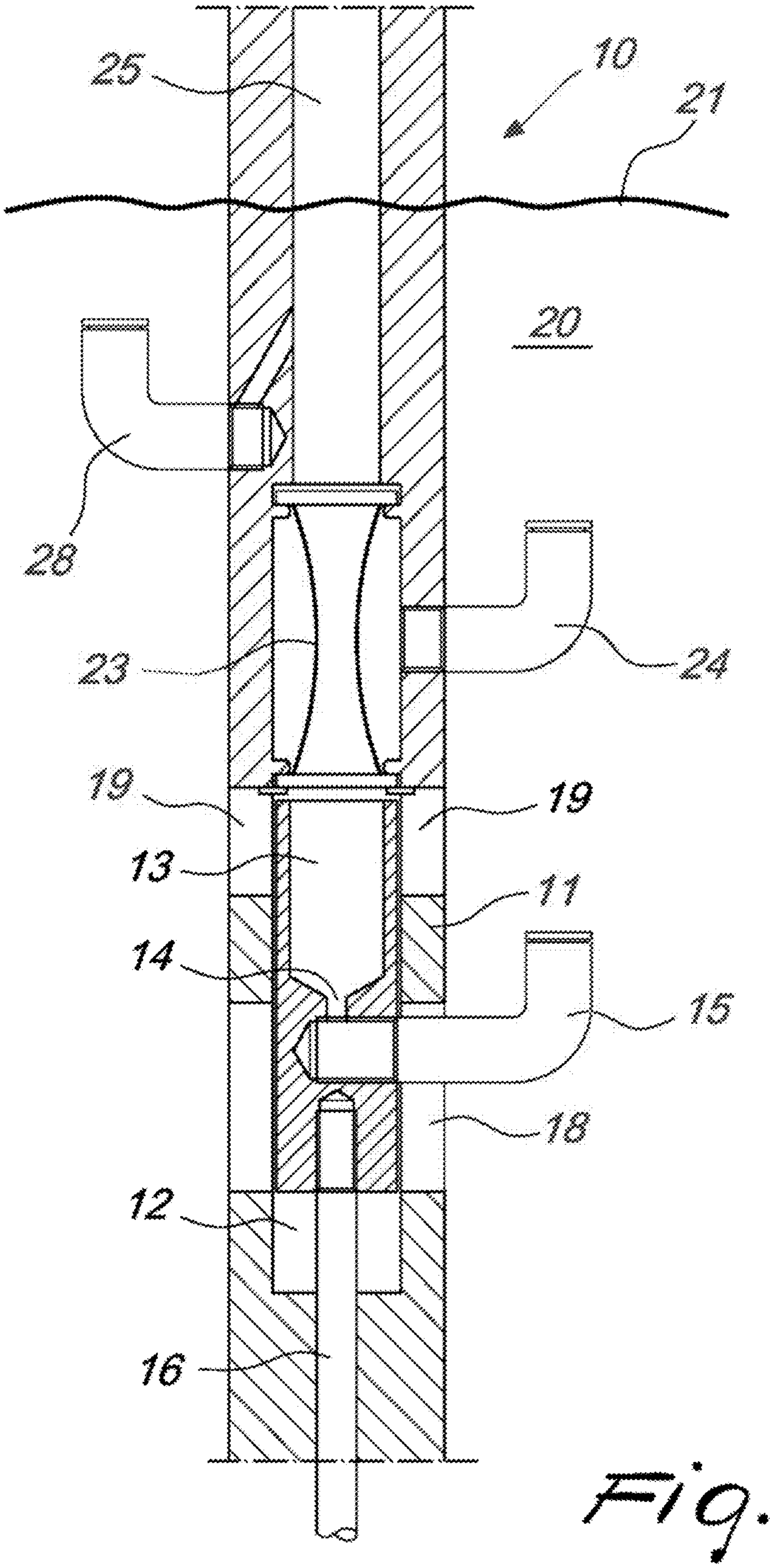
FIG. 2 is a partially sectional view of the pump according to the invention, shown in the step of positioning the compartment for powder ejection.

With particular reference to FIGS. 1 and 2, the powder supply pump is generally designated by the reference numeral 10.

The pump 10 has an outer containment body 11 having a substantially cylindrical internal cavity 12.

A cup 13 is contained in the internal cavity 12 and is open in an upper region. The cup 13 has a lower part 14 connected to a first connector 15 which goes to a pipe through which first pressurized air can be fed.

The connector 15 and the cup 13 are mutually integral and are moved by a rod 16 which moves as indicated by the arrow 17.

To allow the free movement of the connector 15, a slot-like opening 18 is provided in the outer body 11; the opening 18 allows to arrange the cup 13 either all the way down, as shown in FIG. 1, or all the way up, as shown in FIG. 2; the terms "up" and "down" refer to FIGS. 1 and 2.

When the cup 13 is arranged all the way down, as shown by way of example in FIG. 1, openings 19 are open and allow the powder to enter and fill the cup 13; the powder is designated by the reference numeral 20 and its maximum level is indicated by the line 21.

The cup 13 is filled after a predetermined time and the movement rod 16, associated thereto, makes the cup 13 translate upward so that the cup 13 closes the openings 19 and rests its mouth on a pneumatic valve 23, which is closed due to the effect of pressurized air that arrives from a second connector 24.

At this point, the pressure of the air that arrives from the connector 24 is removed and the pneumatic valve 23 opens, while compressed air is fed in from the first connector 15 and pushes the powder contained in the cup 13 toward a duct 25, which is connected to a spray gun 26.

To facilitate the conveyance of the powder 20, additional pressurized air is fed in from a third connector 28.

As can be seen, in this first embodiment, shown schematically, the pump 10 is composed of a small number of parts and in particular of very few moving parts.

For these reasons it is very easy to perform normal maintenance interventions, and also, the powder is not subject to flow with friction against the moving parts, preventing unwanted melting and forming of lumps, that might block the operation of both the pump and the powder dispensing gun.

Figure 3:
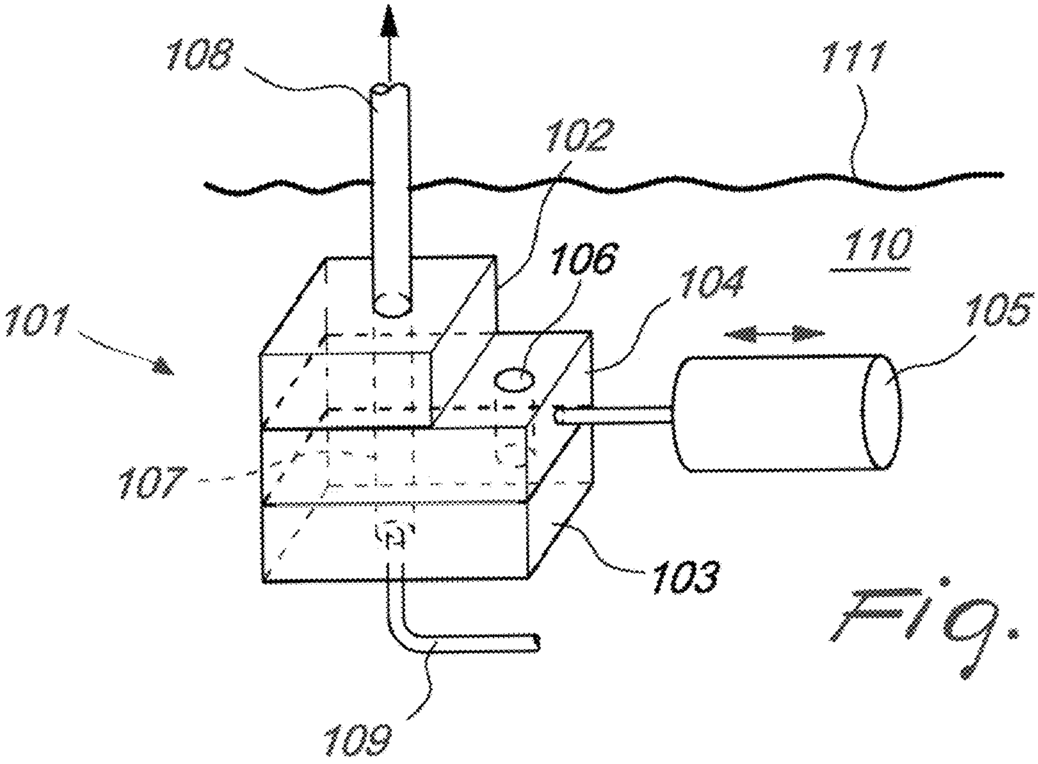
FIG. 3 is a schematic view of a first embodiment of the pump according to the invention.

A first further embodiment of the invention is shown in FIG. 3 wherein a body 101, shown schematically, has a first upper plate 102 and a second lower plate 103, integral with each other.

A movable plate 104, moved by a motorized actuator 105, is interposed between the two plates 102 and 103.

The movable plate 104 has two through cavities, 106 and 107 respectively.

In FIG. 3, the through cavity 107 is in the region interposed between the two plates 102 and 103, in alignment with a discharge pipe 108 that is continuously present in the upper plate 102, and a pipe 109 that is present in the plate 103, through which compressed air is fed to expel the powder that has accumulated in the through cavity 107.

All this is contained in a container of fluidized powder 110, the level of which is represented by the line 111.

In this position, the through cavity 106 is open inside the powder container and fills with powder, while the powder contained in the through cavity 107 is expelled by introducing compressed air from the pipe 109.

When the powder ejection is finished, the movable plate 104 translates, bringing the cavity 106, which is now filled with powder, into alignment with the discharge pipe 108 and the pipe 109.

As a result of the translation of the movable plate 104, the through cavity 107 moves to the outside of the plates 102 and 103 and fills again with powder to be subsequently ejected.

The alternating movement of the movable plate 104 allows continuous feeding of the spray gun, not shown in this FIG. 3.

A lubrication treatment is provided between the movable plate 104 and the fixed plates 102, 103, in order to reduce friction and thus the heat generated, so that any powder present does not melt.

Figure 4:
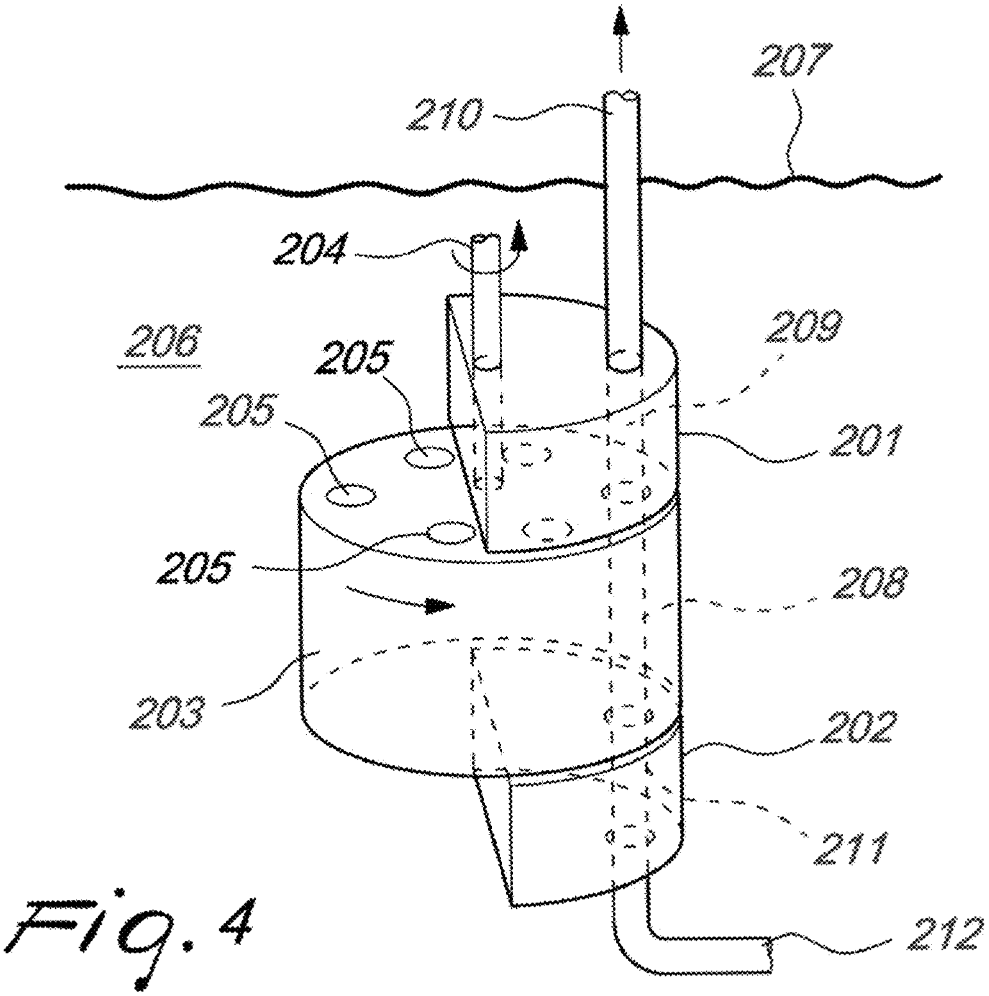
FIG. 4 is a schematic view of a second embodiment of the pump according to the invention.

A further second embodiment of the invention is shown in FIG. 4 wherein a cylindrical body 203 is interposed between two fixed sectors 201 and 202 and is rotated by means of a motor drive of which only the shaft 204 is shown.

The cylindrical body 203 has multiple through cavities; some of the cavities, designated by 205, are open and immersed in the fluidized powder 206; the line 207 shows the level of the fluidized powder 206.

Other similar cavities are included in the region of the sectors 201 and 202; in particular, a cavity 208 is in alignment with the through hole 209 present in the sector 201 which continues with a tube 210 which connects to a spray gun, not shown in FIG. 4.

In the sector 202 there is an additional through hole 211, in alignment with the through hole 209.

This through hole 211 is connected to a compressed air supply duct 212.

Operation is as follows: when the through cavity 208 filled with powder 206 is placed in alignment with the through holes 209 and 211, compressed air is supplied from the duct 212.

The air expels the powder, which supplies the spray gun.

Once the through cavity 208 is emptied, the cylindrical body 203 rotates until another cavity, such as cavity 205, filled with powder, is brought into alignment with the through holes 209 and 211 and the cycle repeats.

Figure 5:
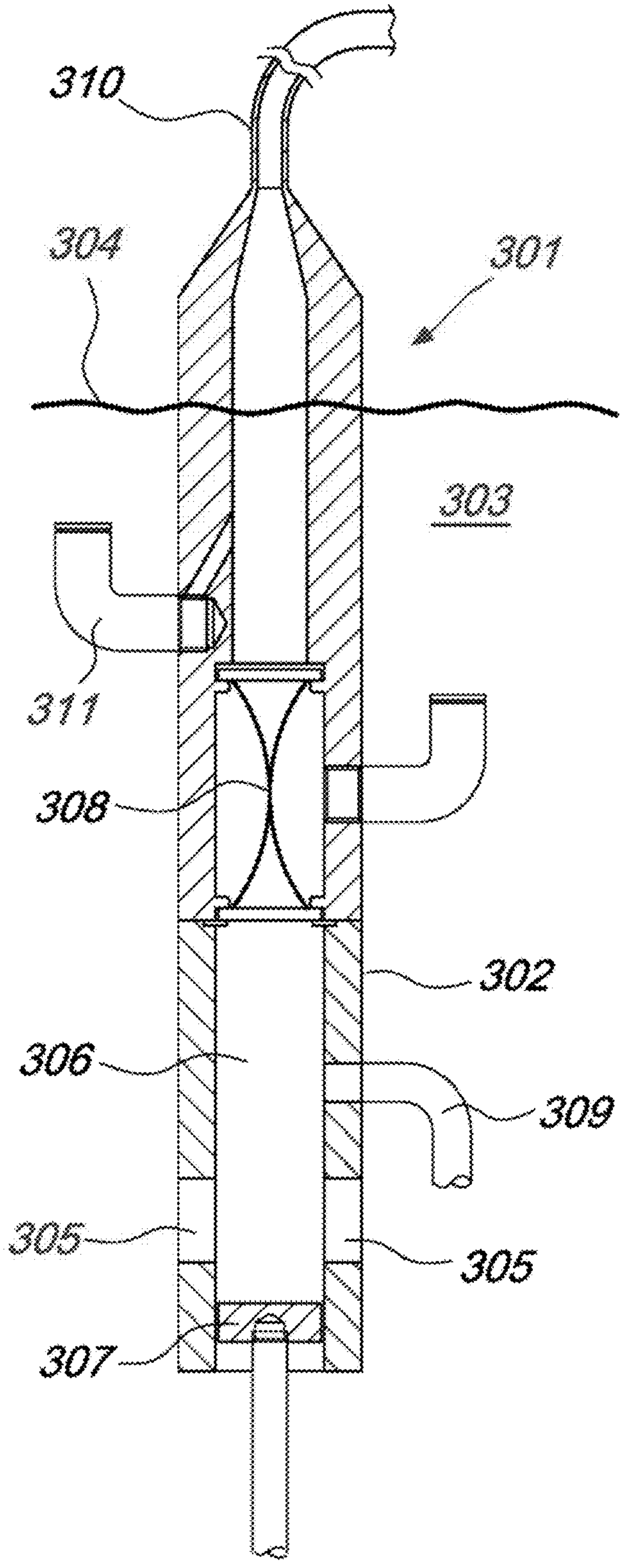
FIGS. 5 and 6 are partially sectional views of a third embodiment of the pump according to the invention, shown in two operating positions.
Figure 6:
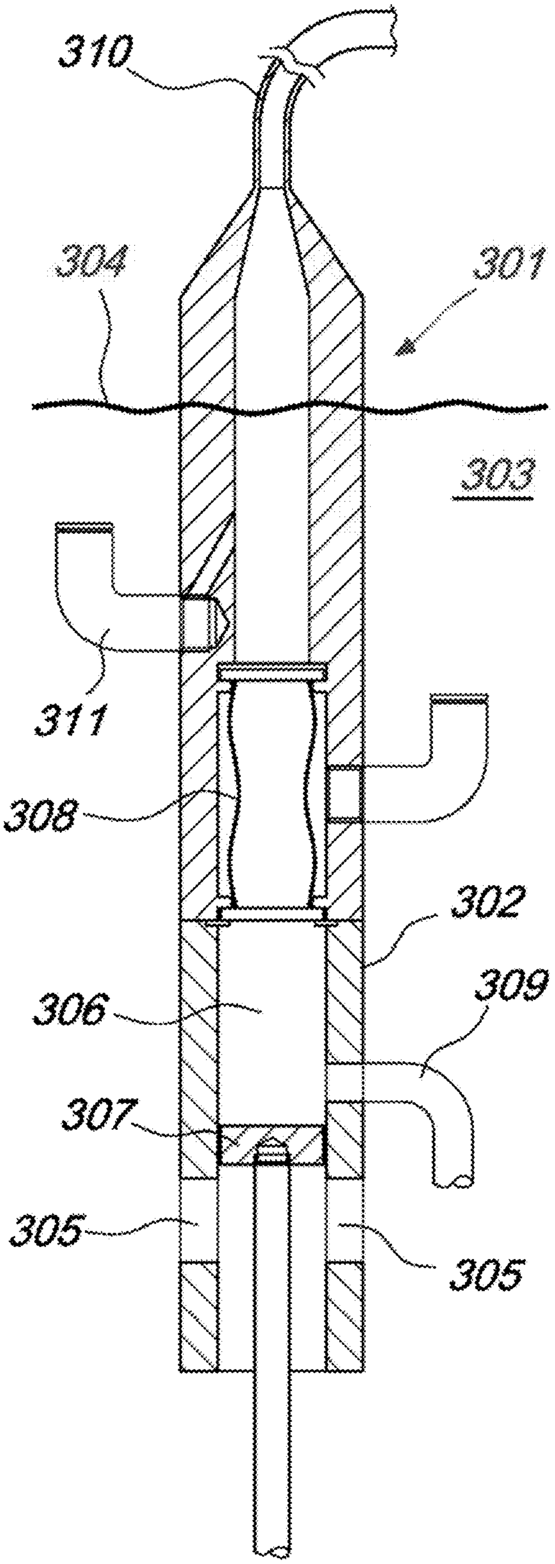

A further embodiment of the invention is shown in FIGS. 5 and 6, wherein, similarly to the embodiment of FIGS. 1 and 2, the pump, generally designated by the reference numeral 301, has a hollow cylindrical body 302, which is immersed in the fluidized powder 303, the level of which is designated by 304.

In the lowest region, as visible in the figure, the cylindrical body 302 has openings 305 that connect the internal cavity 306 to the powder 303.

Below the openings 305, the internal cavity 306 is closed by a motorized piston 307, which in a first position, shown in FIG. 5, leaves the openings 305 open and in a second position, shown in FIG. 6, moves beyond them, isolating the internal cavity 306 when it is filled with powder.

In the internal cavity 306, in an upper region with respect to the figures, there is a pneumatic valve 308, which in FIG. 5 is shown closed, isolating the internal cavity 306, and in FIG. 6 is shown open, allowing the powder contained in the internal cavity 306 to be expelled by introducing compressed air from a duct 309 toward a duct 310 which is connected to a spray gun, not shown.

An additional input of compressed air from a duct 311 facilitates the expulsion of the powder.

The operation is apparent from the figures and the description.

In a pulsed manner, the powder is loaded and expelled without criticalities due to dangerous flows with friction.

Figure 7:
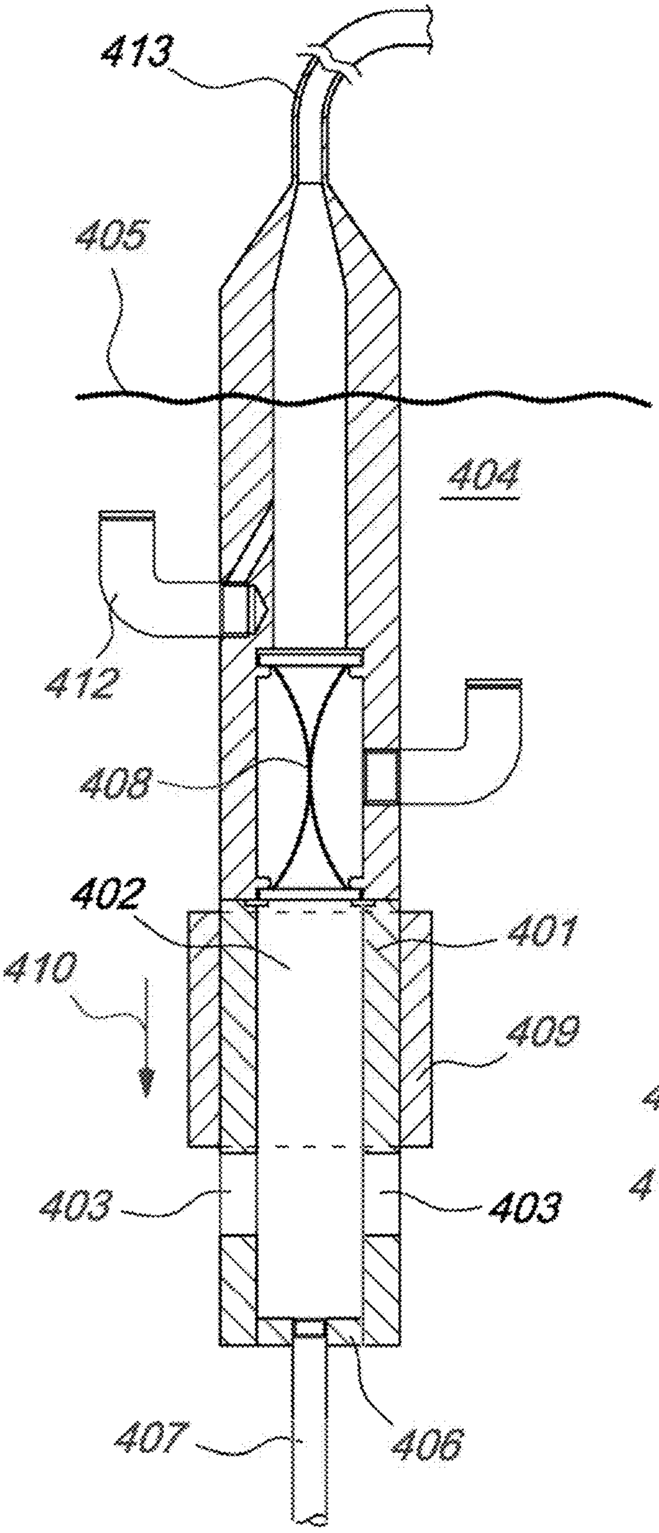
FIGS. 7 and 8 are partially sectional views of a fourth embodiment of the pump according to the invention, shown in two operating positions.
Figure 8:
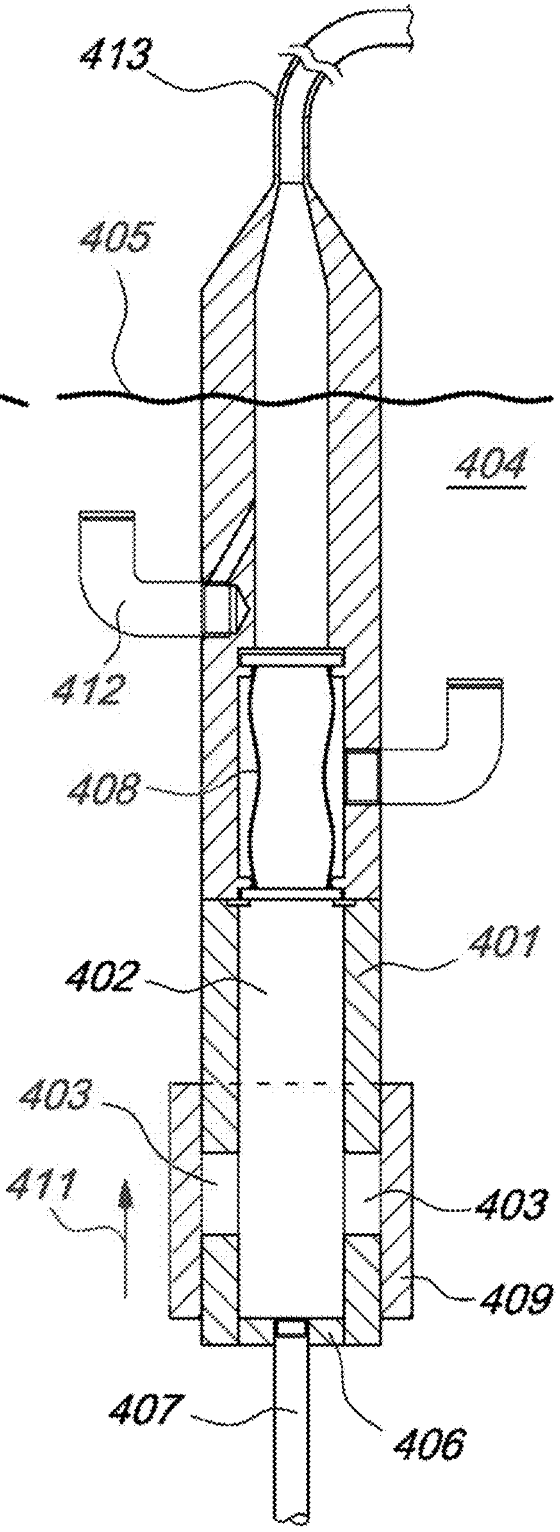

A further embodiment of the invention is shown in FIGS. 7 and 8, wherein, in a manner similar to the embodiment shown in FIGS. 5 and 6, a hollow cylindrical body 401 has an internal cavity 402 provided with openings 403, in a lower region, with respect to the figures; the openings 403 put the internal cavity 402 in communication with the powder 404, the level of which is designated by 405.

In a lower region, there is a partition 406 for closing the internal cavity 402, in which a compressed air supply duct 407 is inserted.

In an upper region, in the internal cavity 402 there is a pneumatic valve 408, which is shown closed in FIG. 7 and is shown open in FIG. 8, and is similar in type and operation to those already described.

Externally to the cylindrical body 401, there is a sleeve 409 which moves as shown by the arrows 410 and 411, so as to open and close the openings 403.

In addition to the pneumatic valve 408, there is also a duct 412 for feeding additional compressed air alternately to the duct 407, creating a continuous flow toward the duct 413 in the condition of FIG. 8.

The operation of the above described embodiment is apparent from the figures and from the description.

The advantages of the invention are apparent from what has been described and shown.

Namely, the pump according to the invention is made of a small number of parts, thus being easy in maintenance and cleaning.

The movable parts that are subject to flow with friction practically do not entail dangerous over-heating.

The pump according to the invention can be used to supply other types of powders, such as gunpowder in equipment for loading bullets or cartridge cases.

The invention claimed is:

1. A powder supply pump, comprising an outer body having an internal cavity; said outer body having a compartment having a volume variable on command by means of a motor drive, from a first condition to a second condition; in said first condition, said compartment fills with powder through openings that are in communication with a container that contains the powder to be dispensed; in said second condition, said compartment is in contact with an initial part of a dispensing duct; said pump further comprising at least one valve member, provided in said dispensing duct, and a first connector for supplying compressed air to said compartment; a second connector actuating said at least one valve member; a third connector supplying air for the conveyance of said powder, wherein said compartment has a cup arranged inside said internal cavity; said cup being movable between a first position, wherein said cup leaves free some of the openings which allow the entry of said powder in said internal cavity and the filling of said compartment, and a second position, wherein said cup is brought into contact with said at least one valve member; said cup having a duct supplying compressed air for expelling the powder.

2. The powder supply pump according to claim 1, wherein said at least one valve member is a pneumatic valve.

3. The powder supply pump according to claim 1, wherein said compartment is formed on a movable plate that moves between two fixed plates; a first fixed plate comprising a hole for supplying compressed air, and a second fixed plate comprising a hole for the passage of the powder to be expelled.

4. The powder supply pump according to claim 1, wherein said compartment is formed by said internal cavity, which is closed by a piston in a lower region; said piston being movable between a position in which said piston leaves some of the openings free for the entry of said powder and a second position in which said piston moves beyond said at least some of the openings and allows to introduce compressed air to expel the powder.

5. The powder supply pump according to claim 1, wherein said compartment is formed by said internal cavity, which is provided with the openings for the entry of said powder; a movable outer sleeve being adapted to leave said openings open or close said openings.

6. The powder supply pump according to claim 1, wherein the pump is embedded in said container and the pump is filled with constantly moving powder.

7. A powder supply pump, comprising an outer body having an internal cavity; said outer body having a compartment having a volume variable on command by means of a motor drive, from a first condition to a second condition; in said first condition, said compartment fills with powder through openings that are in communication with a container that contains the powder to be dispensed; in said second condition, said compartment is in contact with an initial part of a dispensing duct; said pump further comprising at least one valve member, provided in said dispensing duct, and a first connector for supplying compressed air to said compartment; a second connector actuating said at least one valve member; a third connector supplying air for the conveyance of said powder, wherein said compartment is formed on a movable plate that moves between two fixed plates; a first fixed plate comprising a hole for supplying compressed air, and a second fixed plate comprising a hole for the passage of the powder to be expelled.

8. The powder supply pump according to claim 7, wherein said at least one valve member is a pneumatic valve.

9. The powder supply pump according to claim 7, wherein the pump is embedded in said container and the pump filled with constantly moving powder.

10. A powder supply pump, comprising an outer body having an internal cavity; said outer body having a compartment having a volume variable on command by means of a motor drive, from a first condition to a second condition; in said first condition, said compartment fills with powder through openings that are in communication with a container that contains the powder to be dispensed; in said second condition, said compartment is in contact with an initial part of a dispensing duct; said pump further comprising at least one valve member, provided in said dispensing duct, and a first connector for supplying compressed air to said compartment; a second connector actuating said at least one valve member; a third connector supplying air for the conveyance of said powder, wherein said compartment is formed by said internal cavity, which is closed by a piston in a lower region; said piston being movable between a position in which it leaves some openings free for the entry of said powder and a position in which it moves beyond said openings and allows to introduce compressed air to expel the powder.

11. The powder supply pump according to claim 10, wherein said at least one valve member is a pneumatic valve.

12. The powder supply pump according to claim 10, wherein the pump is embedded in said container and the pump filled with constantly moving powder.

13. A powder supply pump, comprising an outer body having an internal cavity; said outer body having a compartment having a volume variable on command by means of a motor drive, from a first condition to a second condition; in said first condition, said compartment fills with powder through openings that are in communication with a container that contains the powder to be dispensed; in said second condition, said compartment is in contact with an initial part of a dispensing duct; said pump further comprising at least one valve member, provided in said dispensing duct, and a first connector for supplying compressed air to said compartment; a second connector actuating said at least one valve member; a third connector supplying air for the conveyance of said powder, wherein said compartment is formed by said internal cavity, which is provided with openings for the entry of said powder; a movable outer sleeve being adapted to leave said openings open or close them.

14. The powder supply pump according to claim 13, wherein said valve member is a pneumatic valve.

15. The powder supply pump according to claim 13, wherein the pump is embedded in said container and is filled with constantly moving powder.

* * * * *